United States Patent

[11] 3,611,298

[72] Inventor Allen G. Jacobson
Ramsey, N.J.

[21] Appl. No. 805,338
[22] Filed Mar. 7, 1969
[45] Patented Oct. 5, 1971
[73] Assignee Computer Transceiver Systems, Inc.
Upper Saddle, N.J.

[54] DATA TRANSMISSION SYSTEM
4 Claims, 1 Drawing Fig.

[52] U.S. Cl. ........ 340/171 R, 325/320
[51] Int. Cl. ........ H04l 27/10, H04q 9/00
[50] Field of Search ........ 340/171, 167; 325/320, 322, 325

[56] References Cited

UNITED STATES PATENTS

| | | | |
|---|---|---|---|
| 2,950,471 | 8/1960 | Hoeppner | 325/325 X |
| 3,230,457 | 1/1966 | Soffel | 325/320 |
| 3,383,499 | 5/1968 | Laidlaw | 235/92 |
| 3,436,753 | 4/1969 | Walker et al. | 235/92 UX |
| 3,514,702 | 5/1970 | Nahay et al. | 325/320 |

*Primary Examiner*—Donald J. Yusko
*Attorney*—Camil P. Spiecens

ABSTRACT: A data transmission system includes a transmitter for transmitting to a receiver data, as coded combinations of first and second bits wherein each of the first bits is represented by a group of substantially sinusoidal waveforms each having a first given period and each of the second bits is represented by a group of substantially sinusoidal waveforms each having a second given period. The receiver comprises means for detecting a given portion of each of the received waveforms, and a source of pulse signals which have a given repetition rate. A pulse counter counts the number of pulse signals occurring during the given portions of each of the waveforms. Count detector means give a first-bit indication when the count in the counter exceeds a first value and gives a second-bit indicator when the count of the pulse signals is less than a second given value. Integrator means receive the first- and second-bit indications to indicate whether the group of waveforms received in a given time interval represents a first-bit or a second-bit as determined by the number of first- and second-bit indications received during the given first-perceived first-perceived In addition the receiver has the facility to detect bits that are represented by different preassigned frequencies of the waveforms.

PATENTED OCT 5 1971 3,611,298
DATA TRANSMISSION SYSTEM RECEIVER
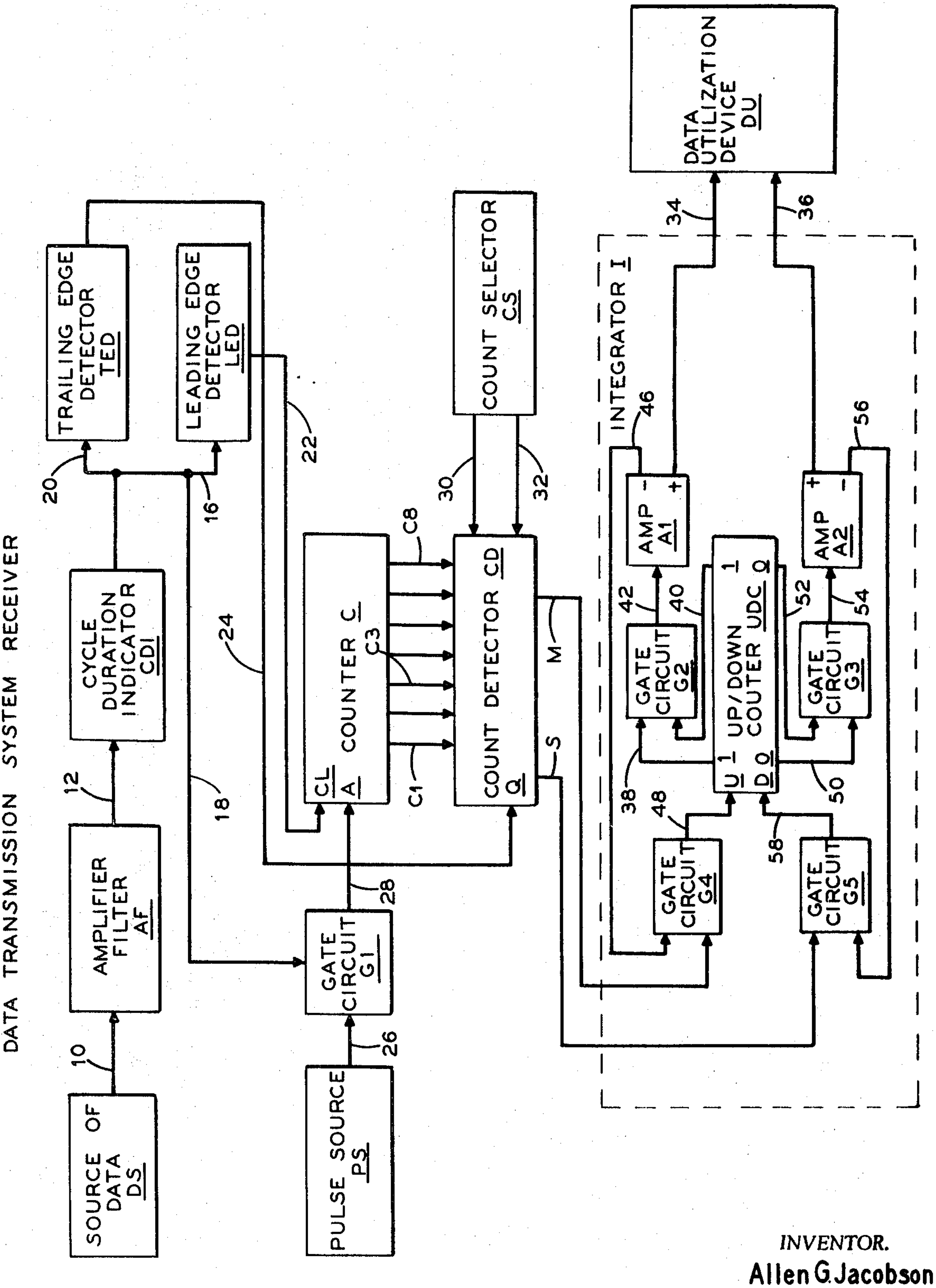
INVENTOR.
Allen G. Jacobson
BY [signature]
ATTORNEY

DATA TRANSMISSION SYSTEM

This invention pertains to data transmission systems and more particularly to such systems employing frequency shift keying to represent the data.

During the past few years there has been a great expansion in the field of data communication. An area of this field which is rapidly growing is concerned with a central data processor servicing a plurality of remote terminals. In order to minimize the expenses of the communication links between the central and the remotes conventional public utility telephone lines are being used. The nature of the telephone lines and the switching equipment makes frequency shift keying techniques more reliable than start-stop coding techniques. The telephone companies have made available to their users "-modems" which interconnect the user's equipment to the lines. However, these modems are expensive.

Therefore, independent suppliers have been making acoustic couplers which require only a conventional telephone for connecting to the telephone lines. The handset of the telephone is placed into a cradle having a coil or microphone adjacent to the earpiece of the handset and a speaker adjacent to the mouthpiece of the handset.

However, the receiving portion of both the telephone companies' modems and the independent suppliers' acoustic couplers have difficulty in detecting the bits being received. These receivers use complex filter schemes to detect the two frequencies representing the bits and quite often the reliability of the detection is suspect.

It is accordingly a general object of the invention to provide an improved receiver of data represented by frequency-shift keying signals.

It is another object to provide an improved frequency-shift keyed data receiver which is highly reliable.

It is a further object of the invention to provide a receiver which while satisfying the above-cited objects is relatively simple and economical to manufacture.

Briefly, the invention contemplates a receiver for a system which transmits data as coded combinations of first and second bits wherein each of said first bits is represented by a group of substantially sinusoidal waveforms each having a first given period and each of said second bits is represented by a group of substantially sinusoidal waveforms each having a second given period. Included in the receiver is means for detecting a given portion of each waveform. There is also provided a source of pulse signals wherein the pulse signals have a given repetition rate. Counting means count the number of pulse signals occurring during the given portions of each of the waveforms. Indicator means gives a first indication when the count of the pulse signals exceeds a first given value and gives a second indication when the count of the pulse signals is less than a second given value. Bit-indicating means receive the first and second indications for indicating whether the group of waveforms being received in a given time interval represents a first or second bit.

Other objects, the features and advantages of the invention will be apparent from the following detailed description when read with the accompanying drawing whose sole FIGURE shows a block diagram of the presently preferred embodiment of the invention.

In the following description the following frequency parameters will be used: In one case, a 2,225 Hz. signal represents a mark and a 2,025 Hz. signal represents a space. In another case 1,200 Hz. represents a mark and 2,200 Hz. represents a space. While such frequencies are desirable, they are not to be construed as limitations since other frequencies could be used within the scope of the invention.

The data transmission system receiver shown in the sole FIGURE can be part of an acoustic coupler connected to a telephone public utility wherein the handset of a telephone is placed into a foam rubber cradle with a coil or microphone at the earpiece and a speaker at the mouthpiece of the telephone.

For the present disclosure source of data DS can be assumed to be the telephone utility and the handset of a telephone whose earpiece portion is acoustically coupled to a coil or microphone. In addition, it will be assumed as a first example that the data is in a mark and space representation, where the mark is a burst or packet of 2,225 Hz. signal and the space is a burst or packet of 2,025 Hz. signal. Thus, the signal fed from the data source DS via line 10 to the amplifier/filter AF is a signal having a frequency of 2,125 Hz. ± 100 Hz. and its harmonics. The filter portion of the amplifier/filter can be an active band-pass filter which eliminates all but the desired frequency (2,125±100 Hz.). More particularly the output of amplifier/filter AF is a sine wave signal at either the mark (2,225 Hz.) or the space (2,025 Hz.) frequency. The sine wave can swing around a reference voltage level wherein each positive lobe is above the level and each negative lobe is below the level. The sine wave signal at the output of amplifier/filter AF is fed via line 12 to the input of cycle duration indicator CDI. Indicator CDI generates a signal whose duration is an indication of the period of each cycle of the sine wave. Preferably, indicator CDI can be a Schmitt trigger circuit which emits a constant amplitude signal as long as the signal at its input is equal to or greater than a given threshold voltage. Thus, by making the threshold voltage of the Schmitt trigger circuit equal to the reference voltage about which the sine wave swings, it is seen that the Schmitt trigger circuit will emit a gate pulse signal during each positive lobe of each cycle of the sine wave signal. The leading edge of the gate pulse signal is coincident with the start of a positive lobe and the trailing edge is coincident with the end of a positive lobe of the sine wave signal. Thus, the duration of the pulse signal equals a half period of the sine wave which is related to the frequency of the sine wave signal.

The gate pulse signal from cycle duration indicator CDI is fed via line 16 to leading edge detector LED: via line 18 to gate circuit G1; and via line 20 to trailing edge detector TED. Leading edge detector LED can be a differentiator followed by a diode biased to only pass, say, positive-going pulses so that a pulse is transmitted on line 22 at the start of each pulse signal transmitted by indicator CDI. Trailing edge detector TED can be a differentiator followed by a diode biased to only pass, say, negative-going pulses and followed by an inverting amplifier so that a positive-going pulse is transmitted on line 24 at the end of each pulse signal transmitted by indicator CDI.

Gate circuit G1 can be a two-input AND circuit which passes clock pulses (received at its first input, connected via line 26, to pulse source PS) to the "add-1" input A of counter C, connected, via line 28, to the output of gate circuit G1 during the presence of a gate pulse signal at its second input, connected via line 18, to the output of indicator CDI. Because of the frequency parameters, previously cited pulse source PS can be a free-running clock pulse generator having a repetition rate of 271 kilopulses/sec. The counter C can be an eight-stage binary counter which increments by one each time a pulse is received at input A and which is cleared to zero each time a pulse is received at clear input CL.

Thus, at the start of a gate pulse signal (related to the start of a positive lobe of the sine wave) generated by indicator CDI, the pulse generated by leading edge detector LED is fed via line 22 to the clear input CL to clear counter C to zero. The gate pulse signal on line 18 opens gate circuit G1 and the clock pulses from pulse source PS unit increment counter C. The count accumulates until the end of the gate pulse signal on line 18 (occurring at the end of a positive lobe). (The accumulated count remains until the start of the next positive lobe of sine wave.) At that time a strobe pulse is emitted by trailing edge detector TED and fed via line 24 to the Q input of count detector CD to sample the accumulated count therein.

Count detector CD at this time is receiving a control signal on line 30 which primes it to detect the particular counts associated with the 2,225/2,025 Hz. mode of bit representation. In particular, if the count is above 120 but below 124 the count is decoded as a space and a pulse is transmitted on line S to integrator I. If the count is above 132 and below 136 the count is decoded as a mark and a pulse is transmitted on line M to integrator I. It should be noted that a particular range of counts is associated with marks and with spaces and that the ranges are separated from each other by a plurality of counts. Thus, ambiguity and errors resulting from slight shifts in frequency are minimized.

If the baud rate of transmission is 110 a tone signal exists for 9.1 msec. per bit. Thus, with a tone frequency of 2.1 kHz. there are approximately 18 cycles of tone per bit. Hence, it is possible to get approximately 18 signals on the lines M and S per bit transmitted.

On the other hand, if the 2,200/1,200 Hz. mode of bit representation were being employed count selector GS would be set to transmit a signal on line 32 to count detector CD. In this case count if the count is above 122 and below 126, the count is decoded as a space and a pulse is transmitted on line S to integrator I. If the count is above 219 and below 231, it is decoded as a mark and a pulse is transmitted on line M to integrator I.

The count detector CD can be a logical network comprising two sets of logic elements such as AND circuits and OR circuits. One set is primed by a signal on line 30 and the other by a signal on line 32. Each set receives the signals on the C1 to C8 signal lines and performs the decoding of the numbers indicated above on the basis of the presence and absence of signals and their inverses of lines C1 and C8. Such logical decoding networks are well known in the art.

Integrator I receives the signals on the lines M and S and transmits a signal on line 34 indicating a mark when three successive signals are received from line M without an intervening signal occurring on line S, and transmits a signal on line 36 indicating a space only when three successive signals are received from line S without an intervening signal occurring on line M.

Integrator I is centered around up/down counter UDC. Counter UDC can be a two-stage binary counter which has a counting capacity of four. Each stage has a "1" output and a "0."The counter has an up input U and a down input D. Whenever a pulse is received by the U input the count is incremented by one, whenever a pulse is received by the D input the count is decremented by one. Such counters are well known.

The "1" outputs of each stage of counter UDC are connected, via lines 38 and 40, to the inputs of gate circuit G2. Thus, when, and only when, a counter of decimal three (binary 11) is stored in counter UDC will a signal be passed by gate circuit G2, via line 42, to the input of paraphase amplifier A1. The positive output of amplifier A1 is connected to line 34, and a mark signal is present thereon whenever a signal is present on line 42. The negative output of amplifier A1 is connected, via line 46, to an input to gate circuit G4 whose other input is connected to lead M. Whenever a signal is present on line 42 amplifier A1 transmits a signal on line 46 to inhibit or block gate circuit G4. The output of gate circuit G4 is connected, via line 48, to the U input of counter UDC. Therefore, whenever counter UDC has a count of decimal three, a mark signal is present on line 34 and any pulses on line M cannot enter the U input of counter UDC. If the accumulated count is less than decimal three no mark signal is present on line 34, and gate circuit G4 can pass a pulse on line M to the up input U.

Similarly, "0" outputs of each stage of counter UDC are connected, via lines 50 and 52, to the inputs of gate circuit G3. Thus, when, and only when, a count of decimal zero (binary 00) is stored in counter UDC will a signal be passed by the gate circuit G3, via line 54, to the input of paraphase amplifier A2. The positive output of amplifier A2 is connected to line 36, and a space signal is present thereon whenever a signal is present on line 54. The negative output of amplifier A2 is connected via line 56, to an input to gate circuit G5 whose other input is connected to lead S. Whenever a signal is present on line 54 amplifier A2 transmits a signal on line 56 to inhibit gate circuit G5. The output of gate circuit G5 is connected, via line 58, to the D input of counter UDC. Therefore, whenever counter UDC has a count of decimal zero a space signal is present on line 36, and gate circuit G5 can pass a pulse on line S to the down input D.

It should be noted that the shift between a mark and a space is not indicated to device DU until at least three successive samples of a mark or a space have been made without a sample of the other kind interposing. Thus, the chance of introducing an error because of transmission noise is minimized.

While such a scheme is worthwhile it is possible to perform a different type of integration over several cycles of tone. In such a case, counter C is to cover the count associated with, say, three cycles of tone and the count detector CD is adjusted to detect the mark and space counts in three contiguous cycles of tone instead of one cycle.

Since all the elements of the system are conventional and well known, the details of these elements will not be shown. However, reference may be had to "High Speed Computing Devices," by the staff of Engineering Research Associates, Inc. (McGraw-Hill Book Inc., Inc., 1950); and appropriate chapters in "Computer Handbook" (McGraw-Hill, 1962) edited by Harvey D. Huskey and Granino A. Korn, and for detailed circuitry, to for example "Principles of Transistor Circuits," edited by Richard F. Shea, published by John Wiley and Sons, Inc., New York and Chapman and Hall, Ltd., London, 1953 and 1957. In addition, other references are: For system organization and components: "Logic Design of Digital Computers," by M. Phister, Jr., (John Wiley and Sons, New York); "Arithmetic Operations in Digital Computers" by R. K. Richards (D. Van Nostrand Company, Inc., New York). For circuits and details: "Digital Computer Components and Circuits," R. K. Richards (D. Van Nostrand Company, Inc., New York).

Especially worthwhile books for finding the components mentioned in the specification, and the hardware for realizing the components as well as the techniques for interconnecting the elements are "DIGITAL Logic Handbook," 1968 edition, copyrighted in 1968 by the Digital Equipment Corporation of Maynard, Mass., "Digital Small Computer Handbook," 1968 Maynard edition, Copyrighted in 1967 by Digital Equipment Corporation of Maynard, Mass., and "DIGITAL Industrial Handbook" 1968 edition, having a similar copyright.

While only one embodiment of the invention has been shown and described in detail, there will now be obvious to those skilled in the art, many modifications and variations satisfying many or all of the objects of the invention without departing from the spirit thereof as defined by the appended claims.

What is claimed is:

1. A receiver for a system which transmits data as coded combinations of first and second bits wherein each of said first bits is represented by a group of substantially sinusoidal waveforms, each of said waveforms having a first given period, and each of said second bits is represented by a group of substantially sinusoidal waveforms, each of said waveforms having a second given period, said receiver comprising: means for detecting a given portion of each of each of said waveforms; a source of pulse signals wherein the pulse signals have a given repetition rate; means for counting the number of said pulse signals occurring during said given portion of each of said waveforms; means for giving a first indication when the count of the pulse signals is within a first range of values and for giving a second indication when the count of the pulse signals is within a second range of values different from said first range during said given portion of each of said waveforms; and indication counter means receiving said first and second indications for indicating whether the bit being received during a given time interval is a first bit or a second bit in accordance with whether a given number of said first indications or a given number of said second indications is received during said given time interval, said indication counter means being an up-down counter having input means for receiving said first indications and second indications and an output for giving an indication as long as the accumulated count exceeds a certain value, said up-down counter including means for adding one to the accumulated count whenever a first indication is received and for subtracting one from the accumulated count whenever a second indication is received.

2. The receiver of claim 1 wherein said first and second ranges are separated by a plurality of values.

3. The receiver of claim 1, further comprising means for controllably changing said given values.

4. The receiver of claim 1 further comprising means for preventing the accumulated count from extending beyond a range of upper and lower values which bracket said certain value.